(12) United States Patent
Nguyen et al.

(10) Patent No.: US 12,507,014 B2
(45) Date of Patent: Dec. 23, 2025

(54) DIAPHRAGM AND MEMS MICROPHONE

(71) Applicant: AAC ACOUSTIC TECHNOLOGIES (SHENZHEN) CO., LTD., Shenzhen (CN)

(72) Inventors: Minh Ngoc Nguyen, Bac Ninh (VN); Linlin Wang, Shenzhen (CN); Rui Zhang, Shenzhen (CN); Kaijie Wang, Shenzhen (CN); Zhengyu Shi, Shenzhen (CN); Zhuanzhuan Zhao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 156 days.

(21) Appl. No.: 18/604,440

(22) Filed: Mar. 13, 2024

(65) Prior Publication Data

US 2024/0414478 A1  Dec. 12, 2024

Related U.S. Application Data

(63) Continuation of application No. PCT/CN2023/101344, filed on Jun. 20, 2023.

(30) Foreign Application Priority Data

Jun. 7, 2023  (CN) .......................... 202321442801.4

(51) Int. Cl.
*H04R 7/20* (2006.01)
*H04R 7/04* (2006.01)
*H04R 7/18* (2006.01)
*H04R 19/04* (2006.01)

(52) U.S. Cl.
CPC ................. *H04R 7/18* (2013.01); *H04R 7/04* (2013.01); *H04R 19/04* (2013.01); *H04R 2201/003* (2013.01)

(58) Field of Classification Search
CPC ... H04R 7/16; H04R 7/18; H04R 7/24; H04R 19/005; H04R 2201/003; H04R 2307/207
See application file for complete search history.

(56) References Cited

U.S. PATENT DOCUMENTS 9,227,843 B2 * 1/2016 Dehe .................... B81C 1/00166
9,681,243 B2 * 6/2017 Guo ......................... H04R 7/26
10,375,483 B2 * 8/2019 Cargill .................. B81B 3/0027
(Continued)

*Primary Examiner* — Ryan Robinson
(74) *Attorney, Agent, or Firm* — Wiersch Law Group

(57) ABSTRACT

Provided is a diaphragm and a micro-electromechanical system (MEMS) microphone. The diaphragm includes a vibrating portion and a support structure. The support structure includes a cantilever portion. Lengths of the first and second anchoring portion both extend along a circumferential direction of the vibrating portion, and a length extension direction of the first anchoring portion is opposite to that of the second one. The lengths of the first and second anchoring portions both extend along the circumferential direction of the vibrating portion, and the length extension direction of the first anchoring portion is opposite to that of the second one, so that the first and second anchoring portions and the cantilever portion are connected in a T shape. A vibration displacement range of the diaphragm is larger, thereby improving sensitivity and compliance of the MEMS microphone.

10 Claims, 4 Drawing Sheets

(56) References Cited

U.S. PATENT DOCUMENTS

| | | | |
|---|---|---|---|
| 10,715,924 B2* | 7/2020 | Cheng | H04R 31/00 |
| 11,553,282 B2* | 1/2023 | Sun | H04R 19/04 |
| 11,968,497 B2* | 4/2024 | Shi | H04R 19/005 |
| 12,096,183 B2* | 9/2024 | Chen | H04R 19/005 |
| 12,323,753 B2* | 6/2025 | Chen | H04R 7/04 |
| 2016/0088400 A1* | 3/2016 | Yoo | H04R 31/00 |
| | | | 216/13 |
| 2016/0304337 A1* | 10/2016 | Miao | B81C 1/00158 |
| 2018/0220240 A1* | 8/2018 | Yoo | B81B 3/007 |
| 2021/0136483 A1* | 5/2021 | Hsieh | H04R 19/04 |

* cited by examiner

DIAPHRAGM AND MEMS MICROPHONE

TECHNICAL FIELD

The present application belongs to the technical field of micro-electromechanical system (MEMS) microphones, and in particular, to a diaphragm and a MEMS microphone.

BACKGROUND

In the related art, the MEMS microphone includes a base, a backplate, and a diaphragm. The diaphragm is an important component of the MEMS microphone, which generally includes a vibrating portion and a support structure connected to the vibrating portion. The support structure is generally designed as a cantilever beam to provide support. The cantilever beam has one end connected to the vibrating portion and the other end anchored to the base or the backplate. Due to small deformation of the cantilever beam, a vibration displacement range of the diaphragm is relatively small, thereby reducing sensitivity of the microphone to some extent.

Therefore, it is necessary to provide a new diaphragm.

SUMMARY

An objective of the present application is to provide a diaphragm and a MEMS microphone, which can solve the problem of small vibration displacement of the diaphragm in the related art.

The technical solutions of the present application are as follows.

A diaphragm includes a vibrating portion and a support structure connected to the vibrating portion. The support structure includes a cantilever portion extending outwards from a periphery of the vibrating portion, and a first anchoring portion and a second anchoring portion both connected to an end of the cantilever portion facing away from the vibrating portion. Lengths of the first anchoring portion and the second anchoring portion both extend along a circumferential direction of the vibrating portion, and a length extension direction of the first anchoring portion is opposite to a length extension direction of the second anchoring portion.

As an improvement, the first anchoring portion has a first anchoring region, the first anchoring region is located at an end of the first anchoring portion facing away from the cantilever portion; the second anchoring portion has a second anchoring region, and the second anchoring region is located at an end of the second anchoring portion facing away from the cantilever portion.

As an improvement, lengths of the first anchoring region and the second anchoring region are both within a range of 60 μm to 80 μm, a width of the first anchoring region is less than that of the first anchoring portion, and a width of the second anchoring region is less than that of the second anchoring portion.

As an improvement, a first fillet is formed at a joint of the cantilever portion and the first anchoring portion, a second fillet is formed at a joint of the cantilever portion and the second anchoring portion, and radii of the first fillet and the second fillet are both within a range of 5 μm to 15 μm.

As an improvement, a third fillet is formed at a joint of the vibrating portion and the cantilever portion, and a radius of the third fillet is within a range of 30 μm to 60 μm.

As an improvement, a length of the cantilever portion is within a range of 60 μm to 80 μm, and a width of the cantilever portion is within a range of 15 μm to 25 μm.

As an improvement, a cross section of the vibrating portion is in a shape of a circle or a polygon.

As an improvement, the support structure includes a plurality of support structures connected to the vibrating portion, and the plurality of support structures are distributed at equal angular intervals with respect to a central axis of the vibrating portion.

A MEMS microphone includes a base, a back plate fixed to the base and having a plurality of acoustic holes, and a diaphragm as described in any one of the above fixed to the base or the back plate. The first anchoring portion and the second anchoring portion are both fixed to the base or the back plate.

As an improvement, a plurality of convex columns are fixed to the base and/or the back plate, and the convex columns are in contact with the diaphragm.

The present application has the following beneficial effects. The lengths of the first anchoring portion and the second anchoring portion both extend along the circumferential direction of the vibrating portion, and the length extension direction of the first anchoring portion is opposite to the length extension direction of the second anchoring portion, so that the first anchoring portion, the cantilever portion, and the second anchoring portion are connected to each other in a T shape. That is, the support structure is a T-shaped beam. The T-shaped beam has larger deformation than the cantilever beam has in the related art, so that a vibration displacement range of the diaphragm is larger, thereby improving sensitivity and compliance of the MEMS microphone. In addition, the support structure is provided with two anchoring portions, which, on the one hand, can improve stiffness of the diaphragm and effectively release stress of the diaphragm, to increase a signal-to-noise ratio, and improve reliability, and on the other hand, can minimize a risk of wrinkling.

DESCRIPTION OF EMBODIMENTS

The present application is further described below with reference to the accompanying drawings and embodiments.

Figure 3:
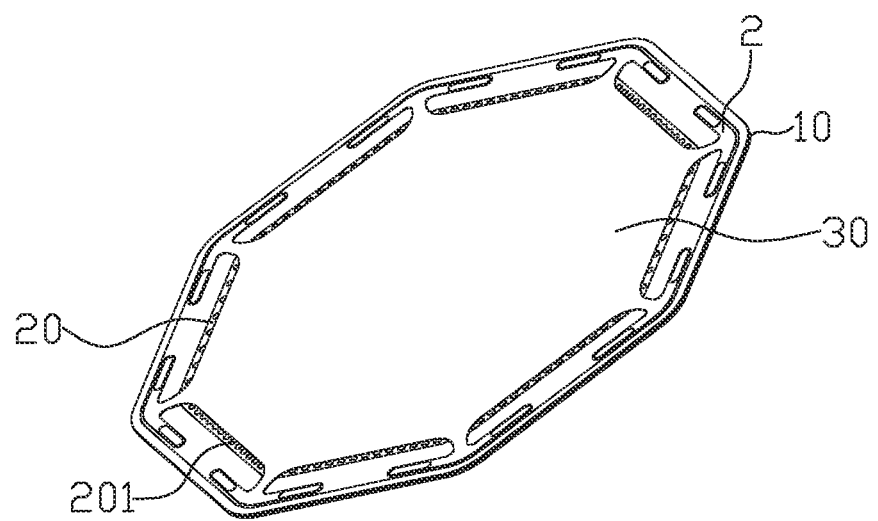
FIG. 3 is a schematic structural diagram of a MEMS microphone according to an embodiment of the present application.
Figure 4:
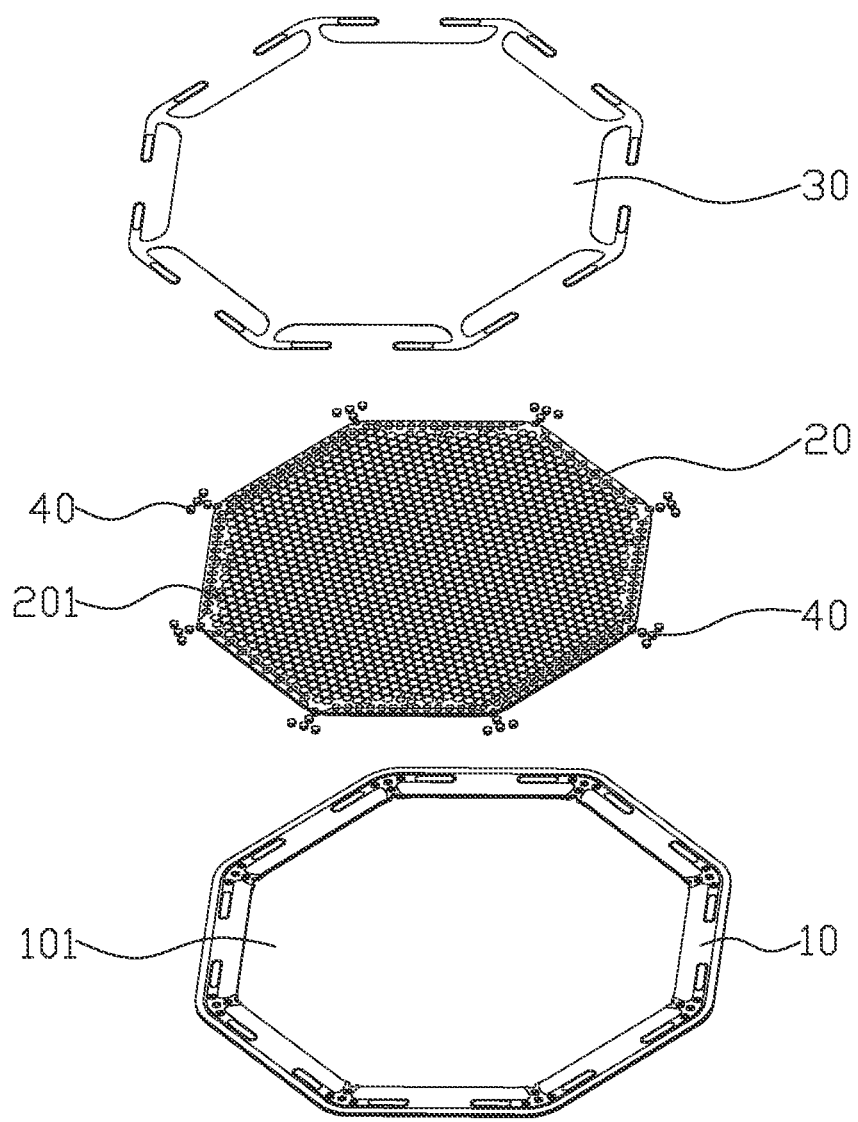
FIG. 4 is an exploded view of a MEMS microphone according to an embodiment of the present application.

Referring to FIG. 3 and FIG. 4, embodiments of the present application provide a MEMS microphone, including a base 10, a back plate 20 fixed to the base 10 and having a plurality of acoustic holes 201, and a diaphragm 30 fixed to the base 10 or the back plate 20. In an embodiment, the base 10 is provided with a receiving cavity 101, and the back plate 20 is fixed in the receiving cavity 101. The acoustic holes 201 provided in the back plate 20 are configured to conduct sound and balance sound pressure. The diaphragm 30 is fixed to the base 10 and located on one side of the back plate 20. The diaphragm 30 and the back plate 20 form a capacitor structure. It should be understood that, in an operating state, the diaphragm 30 deforms under the sound pressure, and a capacitance value of an electric field between the diaphragm 30 and the back plate 20 changes. The changes of the capacitance reflects magnitude of the sound pressure. Since the back plate 20 does not deform, vibration displacement of the diaphragm 30 directly affects the capacitance value, thereby affecting sensitivity of the microphone.

Figure 1:
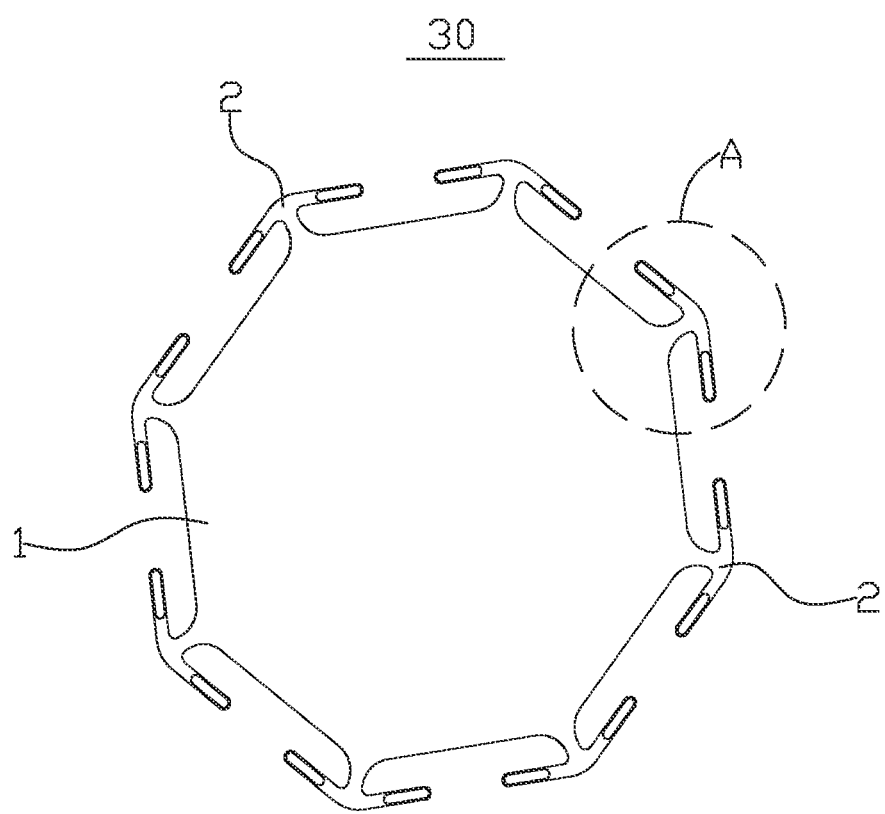
FIG. 1 is a schematic structural diagram of a diaphragm according to an embodiment of the present application.
Figure 2:
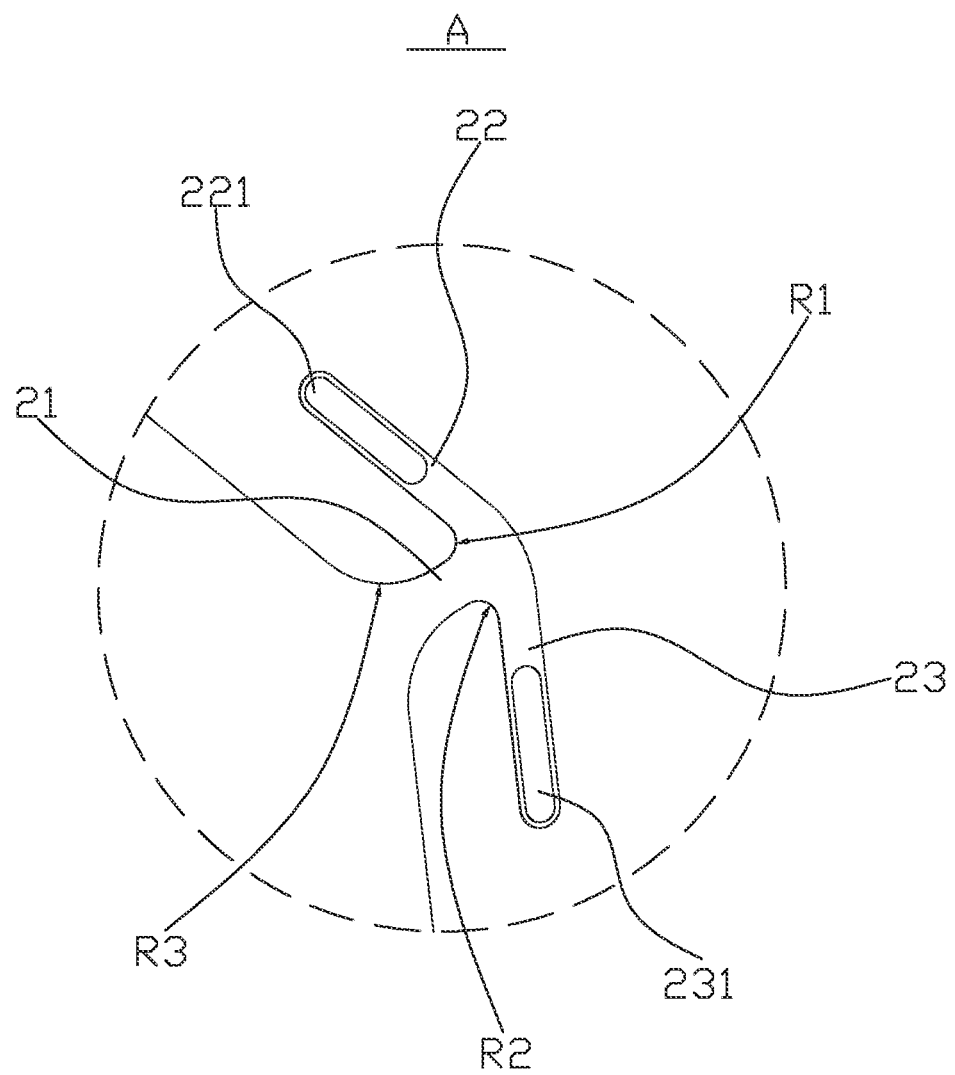
FIG. 2 is an enlarged view of detail A in FIG. 1.

Referring to FIG. 1 and FIG. 2, the diaphragm 30 includes a vibrating portion 1 and a support structure 2 connected to the vibrating portion 1. The support structure 2 includes a cantilever portion 21 extending outwards from a periphery of the vibrating portion 1, and a first anchoring portion 22 and a second anchoring portion 23 both connected to an end of the cantilever portion 21 facing away from the vibrating portion 1. Lengths of the first anchoring portion 22 and the second anchoring portion 23 both extend along a circumferential direction of the vibrating portion 1, and a length extension direction of the first anchoring portion 22 is opposite to a length extension direction of the second anchoring portion 23.

The lengths of the first anchoring portion 22 and the second anchoring portion 23 both extend along the circumferential direction of the vibrating portion 1, and the length extension direction of the first anchoring portion 22 is opposite to the length extension direction of the second anchoring portion 23, so that the first anchoring portion 22, the cantilever portion 21, and the second anchoring portion 23 are connected to each other in a T shape. That is, the support structure 2 is a T-shaped beam. The T-shaped beam has larger deformation than the cantilever beam has in the related art, so that a vibration displacement range of the diaphragm 30 is larger, thereby improving sensitivity and compliance of the MEMS microphone. In addition, the support structure 2 is provided with two anchoring portions, which, on the one hand, can improve stiffness of the diaphragm 30 and effectively release stress of the diaphragm 30, to increase a signal-to-noise ratio, and improve reliability, and on the other hand, can minimize a risk of wrinkling.

It is to be noted that the first anchoring portion 22 and the second anchoring portion 23 are arranged symmetrically with the cantilever portion 21 as a symmetry axis. Moreover, stiffness of the support structure 2 is increased due to the relevant parameters of the first anchoring portion 22, the second anchoring portion 23, and the cantilever portion 21, which can achieve a high signal-to-noise ratio and improve robustness.

Referring to FIG. 3 and FIG. 4, in some embodiments, the first anchoring portion 22 and the second anchoring portion 23 are both fixed to the base 10 or the back plate 20, a plurality of convex columns 40 are fixed to the base 10 and/or the back plate 20, and the convex columns 40 are in contact with the diaphragm 30, thereby preventing adhesion between the diaphragm 30 and the base 10, and between the diaphragm 30 and the back plate 20, and improving sensitivity of the MEMS microphone. In an embodiment, the first anchoring portion 22 and the second anchoring portion 23 are both fixed to the base 10, a plurality of convex columns 40 are fixed to the base 10, and the convex columns 40 are in contact with the cantilever portion 21, the first anchoring portion 22, and the second anchoring portion 23, respectively.

Referring to FIG. 2, the first anchoring portion 22 has a first anchoring region 221, and the first anchoring region 221 is located at an end of the first anchoring portion 22 facing away from the cantilever portion 21. That is, a length of the first anchoring region 221 is less than that of the first anchoring portion 22. The second anchoring portion 23 has a second anchoring region 231, and the second anchoring region 231 is located at an end of the second anchoring portion 23 facing away from the cantilever portion 21. That is, a length of the second anchoring region 231 is less than that of the second anchoring portion 23. In this case, it is conductive to ensuring that the T-shaped beam has larger deformation than the cantilever beam has in the related art.

In an embodiment, lengths of the first anchoring region 221 and the second anchoring region 231 are both within a range of 60 μm to 80 μm, for example, 60 μm, 65 μm, 70 μm, 75 μm, 80 μm, or the like, preferably 70 μm. A width of the first anchoring region 221 is less than that of the first anchoring portion 22, and a width of the second anchoring region 231 is less than that of the second anchoring portion 23. For example, the widths of the first anchoring portion 22 and the second anchoring portion 23 are 19 μm, and the widths of the first anchoring region 221 and the second anchoring region 231 are 14 μm, so that the T-shaped support structure 2 meets certain stiffness and deformation at the same time.

Referring to FIG. 2, a first fillet R1 is formed at a joint of the cantilever portion 21 and the first anchoring portion 22, a second fillet R2 is formed at a joint of the cantilever portion 21 and the second anchoring portion 23, and radii of the first fillet R1 and the second fillet R2 are both within a range of 5 μm to 15 μm, for example, 5 μm, 8 μm, 10 μm, 12 μm, 14 μm, 15 μm, or the like, preferably 10 μm. A third fillet R3 is formed at a joint of the vibrating portion 1 and the cantilever portion 21, and a radius of the third fillet R3 is within a range of 30 μm to 60 μm, for example, 30 μm, 35 μm, 40 μm, 45 μm, 50 μm, 60 μm, or the like, preferably 45 μm. The design of the fillets can not only increase sensitivity of the MEMS microphone by increasing an area of the diaphragm 30, but also prevent an influence on reliability of the MEMS microphone caused by excessively concentrated stress at the joints where the fillets are located.

A width of the cantilever portion 21 is greater than the width of the first anchoring portion 22 and the width of the second anchoring portion 23, and a length of the cantilever portion 21 is greater than the length of the first anchoring portion 22 and the length of the second anchoring portion 23. The length of the cantilever portion 21 is within a range of 60 μm to 80 μm, for example, 60 μm, 65 μm, 70 μm, 75 μm, 80 μm, or the like, preferably 70 μm. The width of the cantilever portion 21 is within a range of 15 μm to 25 μm, for example, 15 μm, 18 μm, 20 μm, 22 μm, 25 μm, or the like, preferably 22 μm. The greater the length and the width of the cantilever portion 21 are, the greater the flexibility of the T-shaped support structure 2 is.

It is to be noted that the stiffness (flexibility) of the T-shaped support structure 2 may vary by modifying the lengths and the widths of the first anchoring portion 22, the second anchoring portion 23, and the cantilever portion 21, the sizes and the shapes of the first anchoring region 221 and the second anchoring region 231, and the values of the first fillet R1, the second fillet R2, and the third fillet R3. For example, the first anchoring region 221 and the second anchoring region 231 that are small-sized and the cantilever portion 21 with a longer length can increase the flexibility of the T-shaped support structure 2 and reduce an introduced voltage.

Referring to FIG. 1, a cross section of the vibrating portion 1 is in a shape of a circle or a polygon. The polygon may be a quadrilateral, a pentagon, a hexagon, an octagon, or the like, preferably an octagon. A plurality of support structures 2 are connected to the vibrating portion 1, and the plurality of support structures 2 are distributed at equal angular intervals with respect to a central axis of the vibrating portion 1. In this embodiment, eight support structures 2 are provided at eight corners of the octagonal vibrating portion 1, which is conductive to improving the vibration stability of the diaphragm 30.

The above are merely the embodiments of the present application. It should be noted herein that, for those of ordinary skill in the art, improvements can be made without departing from the creative concept of the present application, but these all fall within the protection scope of the present application.

What is claimed is:

1. A diaphragm, comprising:
   a vibrating portion, and
   a support structure connected to the vibrating portion, wherein the support structure comprises:
   a cantilever portion extending outwards from a periphery of the vibrating portion, and
   a first anchoring portion and a second anchoring portion both connected to an end of the cantilever portion facing away from the vibrating portion,
   wherein the first anchoring portion and the second anchoring portion both extend along a circumferential direction of the vibrating portion, and an extension direction of the first anchoring portion is opposite to an extension direction of the second anchoring portion.

2. The diaphragm as described in claim 1, wherein the first anchoring portion includes a first anchoring region, and the first anchoring region is located at an end of the first anchoring portion facing away from the cantilever portion; and wherein the second anchoring portion includes a second anchoring region, and the second anchoring region is located at an end of the second anchoring portion facing away from the cantilever portion.

3. The diaphragm as described in claim 2, wherein lengths of the first anchoring region and the second anchoring region are both within a range of 60 μm to 80 μm, a width of the first anchoring region is less than a width of the first anchoring portion, and a width of the second anchoring region is less than a width of the second anchoring portion.

4. The diaphragm as described in claim 1, wherein a first fillet is formed at a joint of the cantilever portion and the first anchoring portion, a second fillet is formed at a joint of the cantilever portion and the second anchoring portion, and radii of the first fillet and the second fillet are both within a range of 5 μm to 15 μm.

5. The diaphragm as described in claim 1, wherein a third fillet is formed at a joint of the vibrating portion and the cantilever portion, and a radius of the third fillet is within a range of 30 μm to 60 μm.

6. The diaphragm as described in claim 1, wherein a length of the cantilever portion is within a range of 60 μm to 80 μm, and a width of the cantilever portion is within a range of 15 μm to 25 μm.

7. The diaphragm as described in claim 1, wherein a cross section of the vibrating portion is in a shape of a circle or a polygon.

8. The diaphragm as described in claim 1, wherein the support structure includes a plurality of support structures connected to the vibrating portion, and the plurality of support structures are distributed at equal angular intervals with respect to a central axis of the vibrating portion.

9. A micro-electromechanical system (MEMS) microphone, comprising
   a base,
   a back plate fixed to the base and having a plurality of acoustic holes, and
   the diaphragm as described in claim 1 fixed to the base or the back plate, wherein the first anchoring portion and the second anchoring portion are both fixed to the base or the back plate.

10. The MEMS microphone described in claim 9, wherein a plurality of convex columns are fixed to the base and/or the back plate, and the convex columns are in contact with the diaphragm.

* * * * *